US005199843A

United States Patent [19]

Sferra

[11] Patent Number: 5,199,843

[45] Date of Patent: Apr. 6, 1993

[54] OVERHEAD STORAGE SYSTEM

[76] Inventor: Carl Sferra, 172 Pritchard Ave., Thornwood, N.Y. 10594

[21] Appl. No.: 771,775

[22] Filed: Oct. 4, 1991

[51] Int. Cl.[5] .......... B65G 1/06

[52] U.S. Cl. .......... 414/592; 414/286

[58] Field of Search .......... 414/609, 277, 280, 331, 414/286, 233, 234, 239, 592, 612; 187/8.41, 8.59

[56] References Cited

U.S. PATENT DOCUMENTS

| | | | |
|---|---|---|---|
| 118,128 | 8/1871 | Heavner | 182/144 |
| 1,062,556 | 5/1913 | Smith | 211/175 |
| 1,517,707 | 12/1924 | Castleman | 414/609 |
| 1,634,750 | 1/1927 | Jones | 211/117 |
| 2,155,583 | 4/1939 | Bonnar | 211/1.5 |
| 2,242,891 | 5/1941 | Light | 187/8.59 |
| 2,341,434 | 2/1944 | Forbes | 414/286 X |
| 2,349,389 | 5/1944 | Thompson | 187/8.59 |
| 2,549,984 | 4/1951 | Miller | 108/42 |
| 2,659,647 | 11/1953 | Lyon | 812/234 |
| 2,827,979 | 3/1958 | Thompson | 187/8.41 |
| 2,836,303 | 5/1958 | Lyon | 211/1.5 |
| 3,426,912 | 2/1969 | Perini | 211/121 |
| 3,556,320 | 1/1971 | Henderson | 414/227 X |
| 3,567,039 | 3/1971 | Evans | 211/162 |
| 3,902,427 | 9/1975 | Kastenbein | 414/609 X |
| 3,907,113 | 9/1975 | Kropelnitski | 211/19 |
| 4,193,732 | 3/1980 | Vetter et al. | 414/609 |
| 4,209,276 | 6/1980 | Rosen | 187/8.59 X |
| 4,674,938 | 6/1987 | Van Stokes et al. | 187/8.59 X |
| 4,678,085 | 7/1987 | Sando | 211/28 |
| 4,750,857 | 6/1988 | Kochersperger | 414/609 |
| 4,804,307 | 2/1989 | Motoda | 414/609 X |
| 4,867,627 | 9/1989 | Tseng | 187/8.59 X |

OTHER PUBLICATIONS

L. Sichelman, "Better Use of Space is What Homebuyers Want", Gannett Suburban Newspaper, May 5, 1991, pp. J1 & J8.

*Primary Examiner*—David A. Bucci
*Attorney, Agent, or Firm*—Leo Zucker

[57] ABSTRACT

An overhead storage system particularly suitable for installation within a garage, includes a lift arrangement for receiving and delivering articles to be stored. The lift arrangement includes a mechanism for elevating the articles between a lower position where they can be placed on or removed from the lift arrangement by a person standing on the garage floor, and an upper position a certain distance above the lower position. In the disclosed embodiment, a storing mechanism operates to retrieve articles from or to deliver articles to the lift arrangement at the upper position, and to transport the articles between the upper position and a storage area offset from the upper position which area is at a storage level above and clear of the garage floor.

20 Claims, 5 Drawing Sheets

OVERHEAD STORAGE SYSTEM

BACKGROUND OF THE INVENTION

1. Field of the Invention

The present invention relates generally to mechanized storage systems or arrangements, and particularly to a system in which articles to be stored can be placed on a platform or in a basket near floor level, and elevated to a storage location clear of the floor and other objects in the immediate vicinity.

2. Description of the Known Art

Hand-operated or automated article storage arrangements are known generally, including storage systems adapted for use in home garages. For example, one known arrangement disclosed in U.S. Pat. No. 3,556,320 issued Jan. 19, 1971, shows a garage storage arrangement in which a large item such as a boat can be hoisted by a pulley to a storage position in the loft space of a two-car garage.

Further, U.S. Pat. No. 3,907,113 issued Sept. 23, 1975, shows a bicycle storage system in which a number of vertical rails are fixed against studs of a garage wall. A carriage is mounted to slide on each rail and to support and raise a bicycle by its wheels. A single cable and pulley assembly is provided for selectively engaging each carriage, so that a bicycle supported by the engaged carriage can be raised clear of the garage floor.

Elevating-type structures for use in places other than a garage are also known, particularly for shelving (see U.S. Pat. No. 2,549,984 issued Apr. 24, 1951), and for clothing or merchandise hangers as disclosed in, e.g., U.S. Pat. Nos. 4,678,085 (Jul. 7, 1987) and 2,155,583 (Apr. 25, 1939).

As far as is known, no system or arrangement has been disclosed that allows a person to make use of available, overhead garage space for purposes of storage by allowing the person to load one or more articles of various sizes most any size into a tray or basket, and to elevate the basket with the stored articles to a position clear of the garage floor and other objects (e.g. automobiles) which may be present in the immediate vicinity.

The average homeowner today does not have much storage space available within the rooms of his or her dwelling. Even the typical home garage lacks much free space on the garage floor once an automobile is brought inside. For those homeowners who sorely need storage space, particularly for large bulky items that cannot be easily stowed away in the attic or any room closet space that may exist, the garage has taken on new significance as a storage room and the family automobile has been displaced onto the driveway or street. Having to relegate the family automobile to a location without shelter from severe elements such as heavy precipitation, icy cold winters, salt spray, or intense sunlight over long periods of time, certainly does not prolong the life of the automobile. This is particularly regrettable since the replacement cost of an automobile today probably far exceeds the aggregate value of the various household items which people have come to store in their garages while ousting their cars.

As mentioned, much has been published with respect to the use of closet and attic space for convenient storage. Yet, as far as is known, no system or arrangement has been disclosed by which usually abundant overhead space in most home garages can be used easily and conveniently by a homeowner for article storage. Moreover, there exists a need for a storage arrangement which will allow stored articles to be retrieved without much ado such as having to fetch and open a folding ladder and climb precariously, if not unsafely, into attic space where articles are frequently stored.

SUMMARY OF THE INVENTION

An object of the invention is to overcome the above and other shortcomings of the known article storage systems.

Another object of the invention is to provide an article storage system or arrangement that is easy and convenient for a homeowner to use.

A further object of the invention is to provide an article storage system capable of being installed within any closed structure, for example, an automobile garage, and utilize efficiently overhead space in the structure that would otherwise go unoccupied.

Yet another object of the invention is to provide an article storage system that can be fabricated fairly easily and arranged to be installed safely by most individual homeowners.

According to the invention, an overhead storage system includes lift means for receiving and delivering stored articles. The lift means comprises means for elevating the articles between a lower position at which the articles can be placed on or removed from the lift means by an individual standing at floor level, and an upper position a certain height above the lower position. Storing means is arranged in operative relation with respect to the lift means, for receiving articles from or delivering articles to the lift means at said upper position, and for transporting the articles between the upper position and a storage area offset from the upper position and at a storage level above and clear of the floor level.

According to another aspect of the invention, an overhead storage system includes a garage structure for housing an automobile wherein a certain overhead space exists between the ceiling of the garage and the automobile when the latter is parked on the garage floor, and lift means extending vertically relative to the floor and located out of the way of the automobile when parked on the garage floor, for receiving and deliverying stored articles. The lift means comprises means for eleavating the articles between a lower position at which articles can be placed on or removed from the lift means by an individual standing on the floor, and an upper position for storing of the articles in the overhead space.

For a better understanding of the present invention, together with other and further objects, reference is made to the following description taken in conjunction with the accompanying drawing, and the scope of the invention will be pointed out in the appended claims.

DETAILED DESCRIPTION OF THE INVENTION

Figure 1:
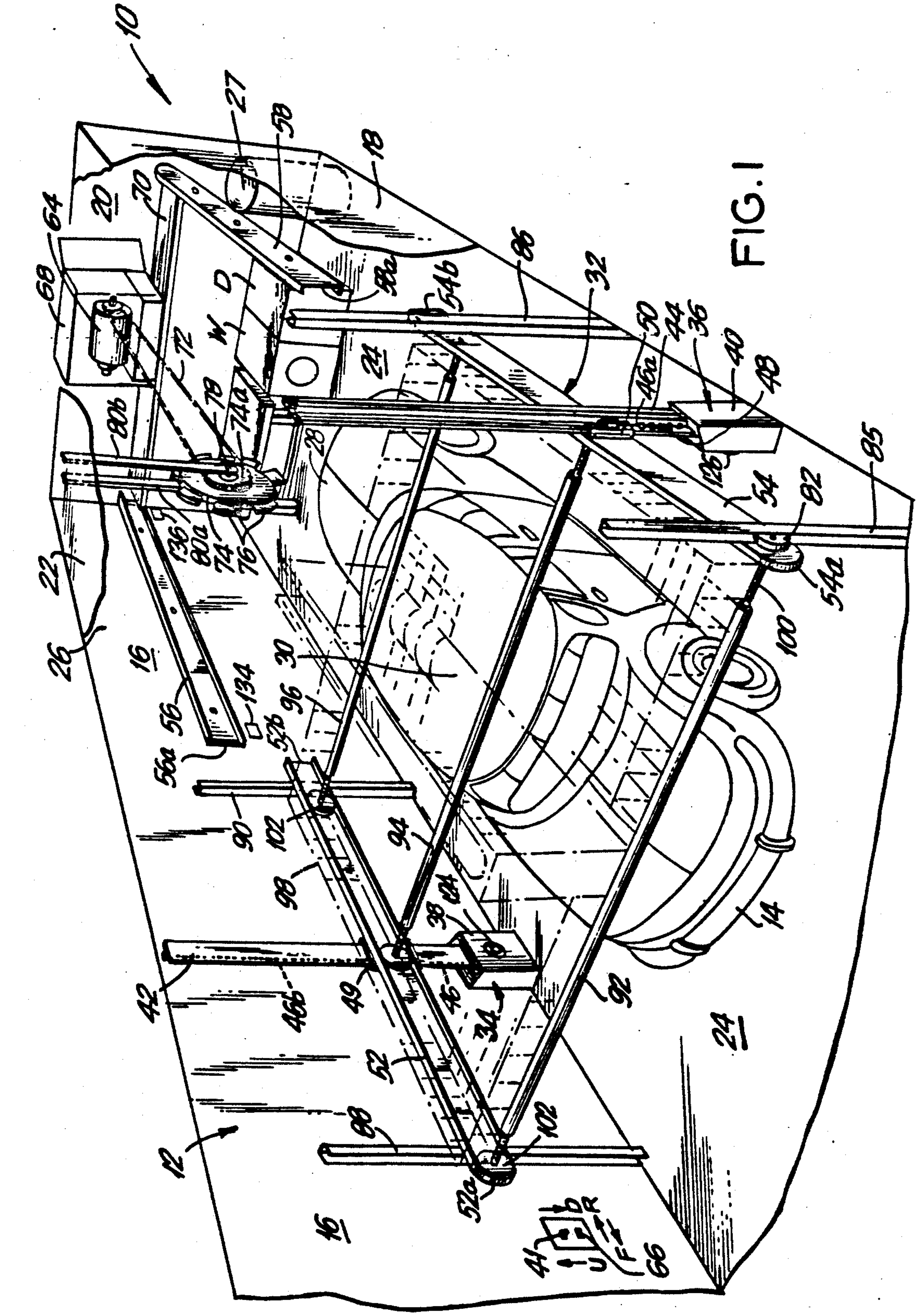
FIG. 1 is a perspective view of a storage system according to the invention, as installed in an automobile garage.

FIG. 1 is a perspective view of an overhead storage system 10 arranged in a garage structure 12, according to the invention.

For purposes of illustration, the garage structure 12 is shown as housing one automobile 14. It will be understood, however, that the present system 10 may be embodied within garage structures capable of accommodating two or more automobiles 14, as well as in other structures generally having a suitable volume of overhead space that is clear of objects or persons that may be present on the floor of the structure.

As shown in FIG. 1, the garage structure 12 includes a left wall 16, right wall 18, and a rear wall 20. The garage also has a ceiling 22 which extends over and above a garage floor 24. The garage ceiling 22 is typically at least eight feet above the floor 24, thus providing ample overhead clearance for the automobile 14 or other family vehicles that may be stored in the garage structure 12. Further, a relatively large amount of clear overhead space is present at a back portion 26 of the garage structure 12, even with automobile 14 parked in the structure 12. Certain household appliances may be located adjacent the garage rear wall 20 such as a washing machine W, electric dryer D, and a hot water heater 27. Air conditioning equipment and/or a workbench may also be found at the rear end of many garages. Homeowners may also place storage racks and shelving (not shown) within arm's reach along the rear wall 20, but an appreciable amount of overhead space is normally left vacant since the ceiling 22 extends well above the average person's reach.

An article storage lifting arrangement 32 of the present overhead storage system 10, includes a left elevating mechanism 34 adjacent the left wall 16 of garage structure 12, and a right elevating mechanism 36 adjacent right wall 18. Each of the mechanisms 34, 36 includes a corresponding motor drive unit 38, 40 mounted at or near the level of the garage floor 24, and a "T" rail member 42, 44 extending vertically from an associated motor drive unit, 38, 40 and appropriately secured to an adjacent garage wall and/or the garage floor 24.

Both the left elevating mechanism 34 and the right elevating mechanism 36, including the motor drive units 38, 40 and the "T" rail members 42, 44, may be provided from parts of conventional garage door openers such as, for example, a Sears "Craftsman" garage door opener Model 139.53699SR, ½ horsepower rating.

Further, each of the elevating mechanisms 34, 36 includes a corresponding link chain drive 46, 48. Each chain drive is driven by a motor (not shown) within each of the drive units 38, 48, and is fixed to one side of a trolley or carriage 49, 50 that slides along the flange of the rail members 42, 44. Operation of the elevating mechanisms is controlled via an "UP/DOWN" switch 41 on the left garage wall 16. Further details of the carriage 49 appear in FIG. 6.

A pair of left and right, horizontally oriented track guide members 52, 54, are each fixed at a point intermediate their ends to the slidable carriages 49, 50. Members 52, 54 are in the form of generally "U"-shaped channels with the open sides of each channel facing one another. The front ends 52*a*, 54*a* of the members 52, 54 are closed by the channel flange (see FIG. 3), and rear ends 52*b*, 54*b* are open (see FIGS. 8 and 9).

Each of the carriages 49, 50 is driven to run on its associated "T" rail member 42, 44 in unison with one another, so that the left and right horizontal guide members 52, 54 are raised or lowered at the same rate.

A left fixed track guide member 56, and a right fixed track guide member 58 are supported at an adjacent garage wall and/or from the garage ceiling a certain height clear of the garage floor 24. Guide members 56, 58 extend parallel to one another and establish a storage area extending between the level of the members 56, 58 and the garage ceiling 22. Also, guide members 56, 58, like the elevating guide members 52, 54, are in the form of generally "U"-shaped channels having open ends 56*a*, 58*a* facing toward the front of the garage structure 12. The open ends 56*a*, 58*a* are located so as to confront closely the open ends 52*b*, 54*b* of the elevating guide members 52, 54 when the latter are at an uppermost position (see FIG. 4).

Figure 4:
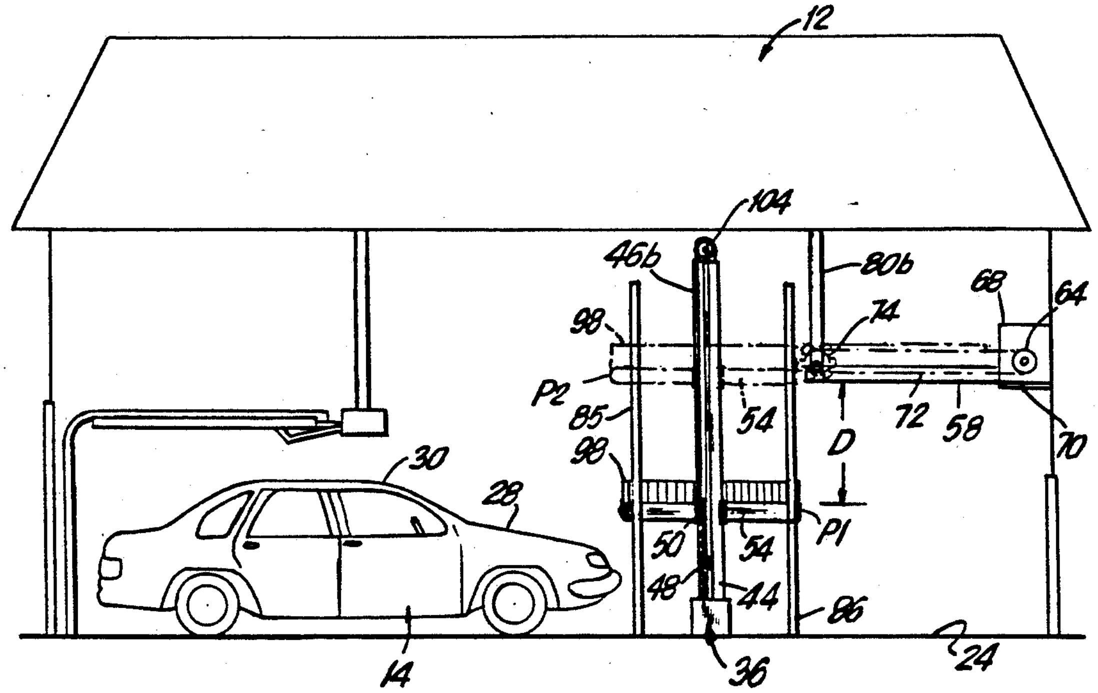
FIG. 4 is an elevational side view showing the interior of a garage structure in which the present storage system can be arranged.

As shown in FIG. 4, the left and right guide members 52, 54 can be moved vertically between a lower position P1 which may be only several feet above the garage floor 24, and an upper position P2 a certain distance D above the lower position P1, upon the simultaneous operation of the left and the right elevating mechanisms 34, 36.

A storage drive motor 64 is mounted at or near the rear wall 20 of the garage structure 12. The drive motor 64 is located midway between the left and the right fixed guide members 56, 58, and its operation is controlled by a switch 66 mounted on the garage wall 16. A protective housing 68 for the motor 64 rests on a support shelf 70 fixed to the rear wall 20 of the garage 12.

The motor housing 68 is at least partially open on its front side so as to allow a drive belt or chain 72 to extend lengthwise of the garage structure 12 to a point at or nearly in line with the open ends 56*a*, 58*a* of the fixed left and right guide members 56, 58. At this point, the drive belt 72 is coupled to a hub 74*a* of a cog wheel 74 having a number of circumferentially spaced, relatively wide teeth 76. The cog wheel 74 itself is mounted for rotation in a vertical plane about a shaft 78 that extends perpendicular to the left and right guide members 56, 58 and which shaft 78 is supported at its ends by a pair of support bars 80*a*, 80*b* extending vertically downwardly from the garage ceiling 22.

Figures 7, 8, 9:
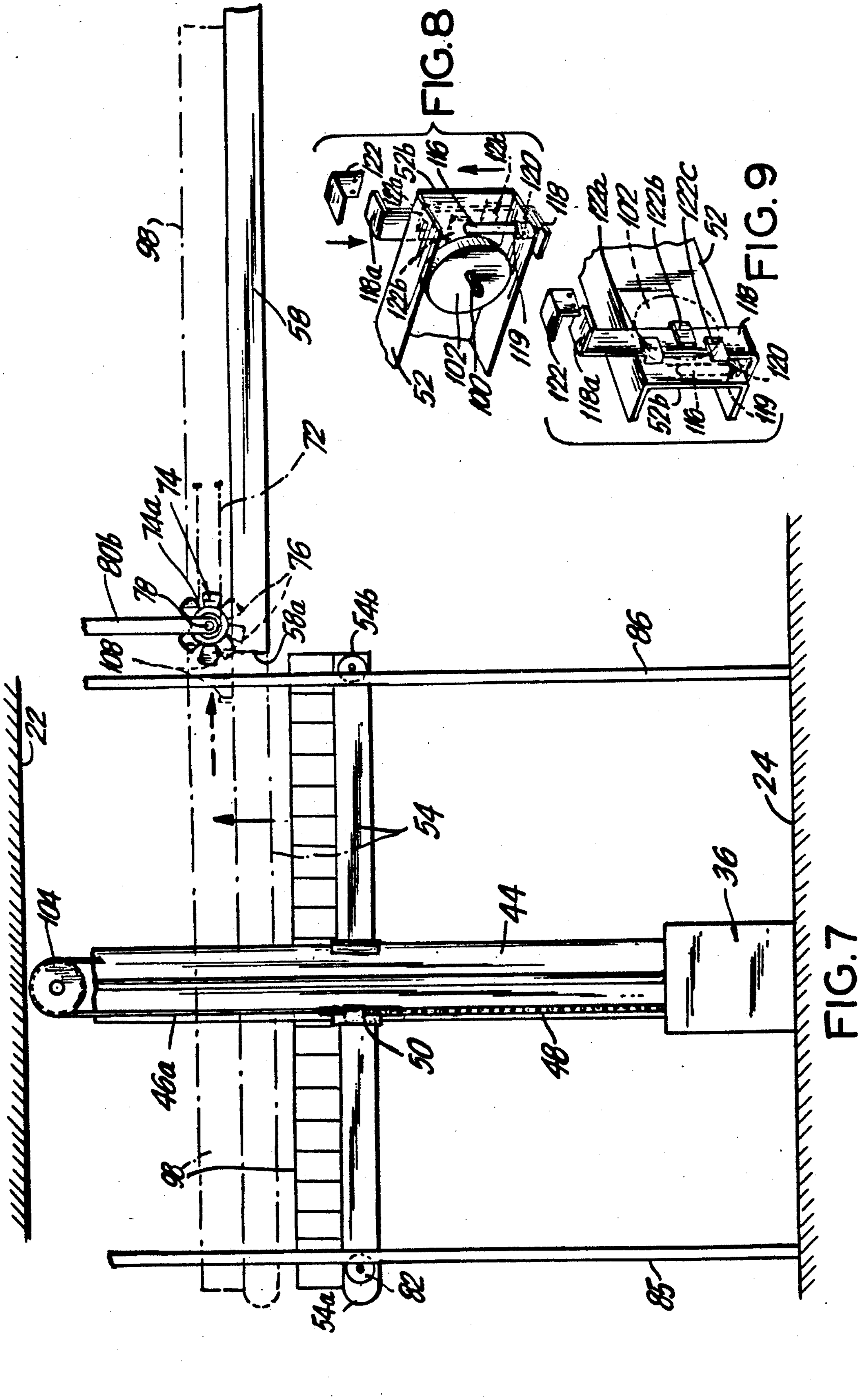
FIG. 7 is an enlarged elevational side view of the present storage system as shown in the garage structure in FIG. 4.
FIG. 8 is a detail view showing a wheel stop arrangement at a rear open end of an elevating guide member.
FIG. 9 is a view of the open end of the guide member in FIG. 8, as seen from the opposite side.

As shown in FIG. 7, the cog wheel 74 is situated so that its teeth 76 extend forwardly of the open ends 56*a*, 58*a* of the fixed guide members.

Figures 2, 3:
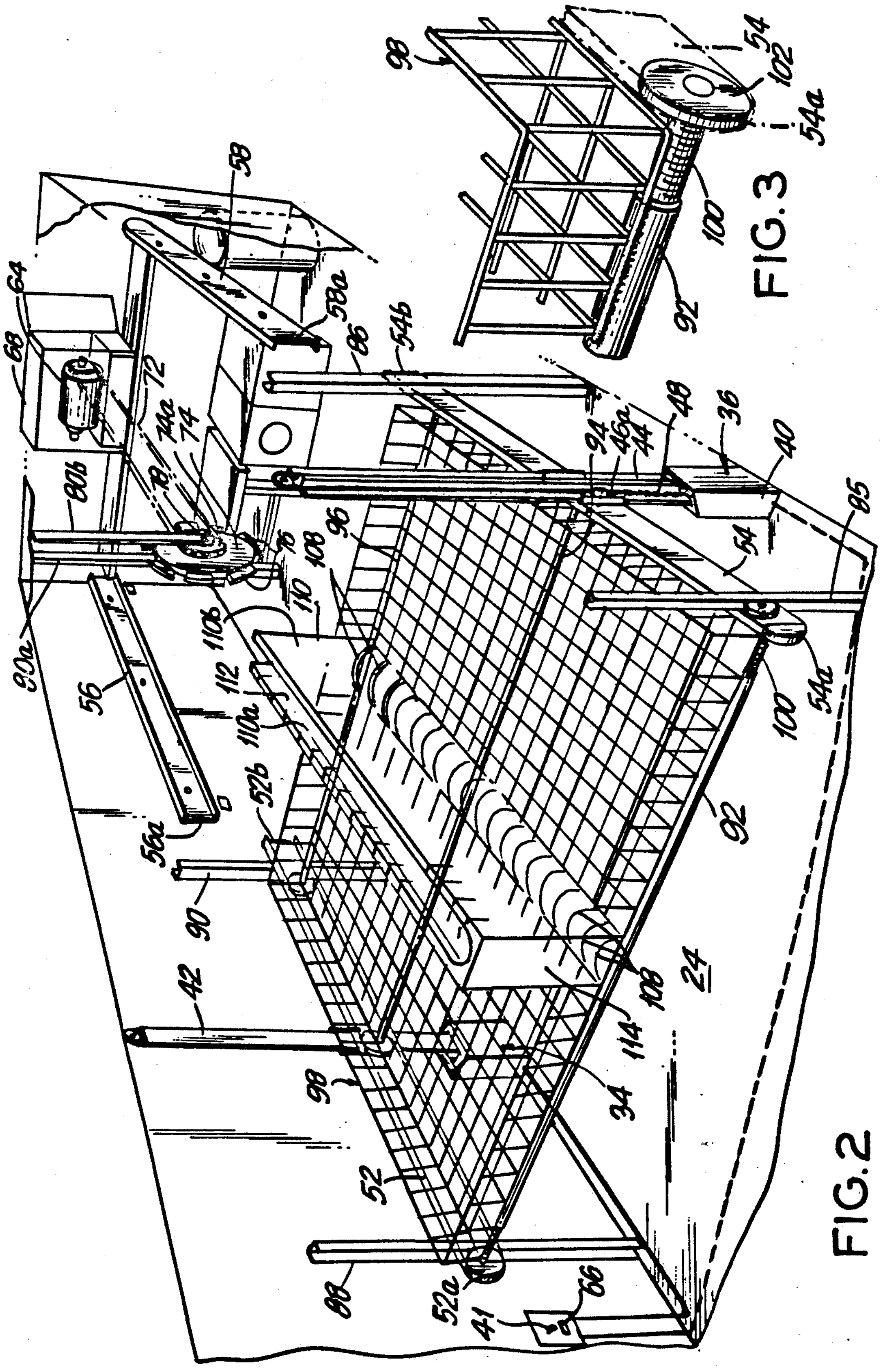
FIG. 2 is a perspective view similar to FIG. 1, showing a large wire platform or basket for carrying stored articles in place on a forward set of elevating track guide members.
FIG. 3 is an enlarged detail view of a corner of the basket in FIG. 2, showing a platform wheel at a forward end of a track guide member.
Figure 5:
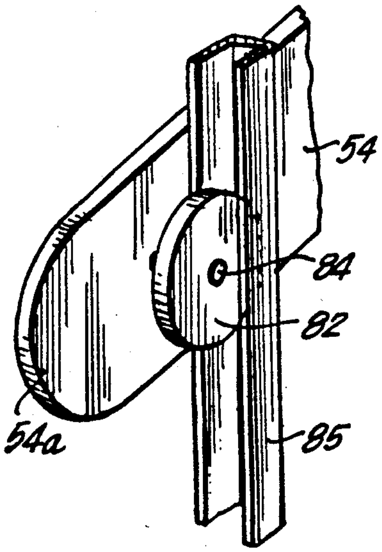
FIG. 5 is a view of a guide member roller engaging an associated support channel.

An arrangement for maintaining the elevating left and right guide members 52, 54 steady from rocking or tilting motion while the members 52, 54 are raised and lowered by the carriages 49, 50, is shown in FIGS. 1, 2 and 5.

Near each end of the guide members 52, 54 there is provided a roller such as the roller 82 shown in the drawing. Roller 82 is mounted for rotation on short shaft 84 that extends from the side of guide member 54 facing opposite its open side. Roller 82 rides inside the opening of a vertical "U" support channel 85 that is supported in a vertical position such as, for example, by fastening of the channel 85 to adjacent garage wall 18 or some other vertical structural member (not shown). Vertical channel 86 is situated near the open end **54*b* of the elevating guide member 54, for engaging another roller (see FIG. 7) situated there. Additional vertical "U" support channels 88, 90 are provided adjacent the front and rear ends 52*a*, 52*b* of the left elevating guide member 52 for engaging corresponding rollers (not shown) at those ends. Accordingly, once the support channel pairs 85, 86 and 88, 90 are properly vertically aligned parallel to one another, and the corresponding rollers 82 are closely fitted in the support channels, the guide members 52, 54 will be restrained from tilting or rocking movement as long as a minimal running clearance exists between the rollers 82** and the bottoms of the corresponding support channels.

FIG. 1 also shows three platform bottom support bars 92, 94 and 96 which are welded or otherwise fastened to the underside of a wire basket platform 98 shown more clearly in FIG. 2. The ends of the support bars 92, 94, 96 are located just short of the side walls of the basket 98, and are in hollow cylindrical form. As shown in FIG. 3, a threaded axle rod 100 engages corresponding threads (not shown) in the interior of the support bar 92, so that a platform wheel 102 pivoted on the outer end of the axle rod 100, can be brought to a desired position ahead of the platform sidewall so as to ride inside the flange of the confronting elevating guide member 54.

The wire platform 98 is of such a depth as to extend from the closed ends **52*a*, 54*a* of the elevating track members 52, 54, to the rear ends 52*b*, 54*b* of the elevating members, with sets of platform wheels 102 riding adjacent ones of the elevating members 52, 54 for smooth sliding movement of the platform 98** along the direction of the members.

Figure 6:
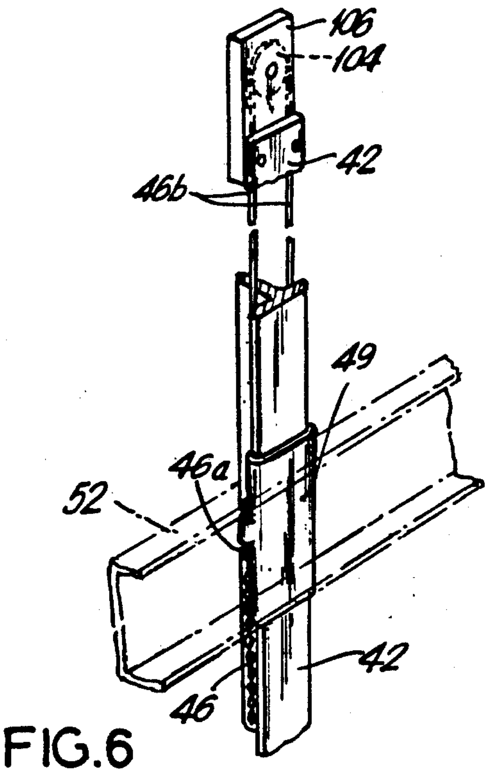
FIG. 6 is a view showing a T-beam for guiding a carriage fixed to an elevating guide member in the vertical direction.

Further details of the carriage 49 (or 50) and its associated components are shown in FIG. 6.

Link chain drive 46 which is driven by the motor drive unit 38 in FIG. 1, runs vertically along both sides of the "T" rail member 42, and is fixed on one side to the body of the carriage 49 by way of a threaded end shaft **46*a*. A wire cable portion 46*b* is also connected at one end to the body of the carriage 49, and extends upwardly around a cable pulley 104. The pulley 104 is pivoted for rotation inside a pulley bracket 106 which bracket is bolted or otherwise fixed at the top end of the "T" rail member 42. The wire cable portion of the link chain drive 46 connects directly to the link portion of the drive via a suitable coupling (not shown) on the side of the rail member 42 not seen in FIG. 6. The carriage 50, link chain drive and other components associated with the "T" rail member 44 at the right side of the garage may be identical to those provided on the left "T" rail member 42 as shown in FIG. 6**.

The wire platform basket 98 as shown in FIG. 2 is constructed with a number of upwardly bent, wire "ears" 108 running successively down the middle of the platform. A center partition wall 110 extends upwardly about the center line of the platform 98 with the wire ears 108 contained between both side walls **110*a*, 110*b* of the center partition 110**.

An elongate slot opening 112 is formed at the top of the center partition 110, the opening 112 running from the rear end of the partition facing the cog wheel 74, to a front end partition wall 114. As explained below, the purpose of the center partition 110 is to prevent articles placed on the platform or basket 98 from moving onto or over the wire ears 108. Such clearance over the ears 108 is necessary to allow the teeth 76 on the wheel 74 to engage the ears 108 when the platform 98 is driven rearwardly to a storage position by the wheel 74.

The elongate opening 112 at the top of the partition 110 allows clearance for the cog wheel 74 with its two side support bars **80*a*, 80*b* as the platform 98 is moved by the wheel 74 onto the fixed guide members 56, 58, and when platform 98 is moved off of the fixed guide members by operation of the wheel 74**, as explained below.

As the left and right elevating guide members 52, 54 move the platform 98 up or down, it is necessary to insure that the platform 98 will remain in place relative to the guide members 52, 54, and not escape by rolling rearwardly out from the open ends **52*b*, 54*b*. As mentioned, such a situation is at least partly avoided by the use of the vertical U support channels 85, 86, 88 and 90 each of which engages a corresponding roller 82 pivoted near the ends of the elevating members 52, 54. Additional safety is provided by virtue of the lip or flange of the guide members 52, 54 which is present at the ends 52*a*, 54*a* of the members and acts to stop the platform wheels 102 from escaping forwardly (see FIG. 3**).

An additional precaution against rearward movement of platform 98 relative to guide members 52, 54 prior to movement of the platform 98 onto the fixed members 56, 58, is illustrated in FIGS. 8 and 9.

FIG. 8 is a view of the open, rear end of elevating guide member 52. A mechanism similar to that to be described in connection with FIGS. 8 & 9 may also be provided at the open end **54*b* of the right elevating guide member 54 either in place of, or in addition to the mechanism at the open end of the left elevating guide member 52**.

In order to prevent the forward platform wheels 102 from rolling out of the open end **52*b* (or 54*b*) of the elevating guide members, a wheel stop plunger 116 extends up through an opening 119 in the bottom flange of the member 52, so as to block the path of movement of the wheel 102 in the forward direction. The bottom end of the plunger 116 is fixed to a lower end of an angle bracket 118 beneath the lower flange of the member 52 and the opening 119. A tension spring 120 is seated coaxially about the lower end of the plunger 116, the spring 120 being fixed at one end to the outside of the lower flange and at its other end to the part of the angle bracket 118 to which the plunger 1?6** is fixed.

Angle bracket 118 is formed so as to extend Vertically along the outside wall of the member 52 (see FIG. 9) and is guided for vertical sliding movement relative to the member 52 by a series of three tabs **122*a*, 122*b*, 122*c* formed on the member 52 by punching or the like. The upper end of the bracket 118 is bent to form an actuator surface 118*a*. As shown in FIG. 8, as the member 52 is elevated upward, the actuator surface 118 of the bracket abuts an actuator bracket 122 which is fixed in position relative to the garage structure 12. For example, actuator bracket 122 may be fixed to a part of the vertical "U" support channel 90 in FIGS. 1 and 2 or to a part of the left wall 16** of the garage.

After contact with the actuator bracket 122, as the elevating member 52 moves upward, the angle bracket 118 slides downwardly relative to the member 52 thus causing the stop plunger 116 to retract out of the path of movement of the platform wheel 102. The point at which the plunger 116 is withdrawn sufficiently to permit forward movement of the platform wheel 102 is set, by appropriate location of the actuator bracket 122 to coincide with the uppermost position P2 of the platform 92, at which position the platform is free to be moved via cog wheel 74 onto the left and right fixed guide members 56, 58.

For purposes of safety, an infrared reversing sensor arrangement including, for example, a light beam emitting device 124 mounted on the left motor drive unit 38, and a light beam sensor 126 mounted on the right motor drive unit 40, are provided. Basically, emitting device 124 emits an infrared light beam parallel to the garage floor 24 and one to two feet above the floor, with the beam aimed at the light beam sensor 126. The circuitry associated with the emitting device 124 and sensor 126 are incorporated in a well-known manner with the left and right motor drive units 38, 40 so that, if the beam is interrupted by an object such as a small child, the left and right elevating guide members 52, 54 will be reversed if they are moving downwardly at the time of the beam interruption and, further, the platform 92 will be prevented from being lowered via the elevating mechanisms 34, 36 until the beam obstruction is removed.

Figure 10:
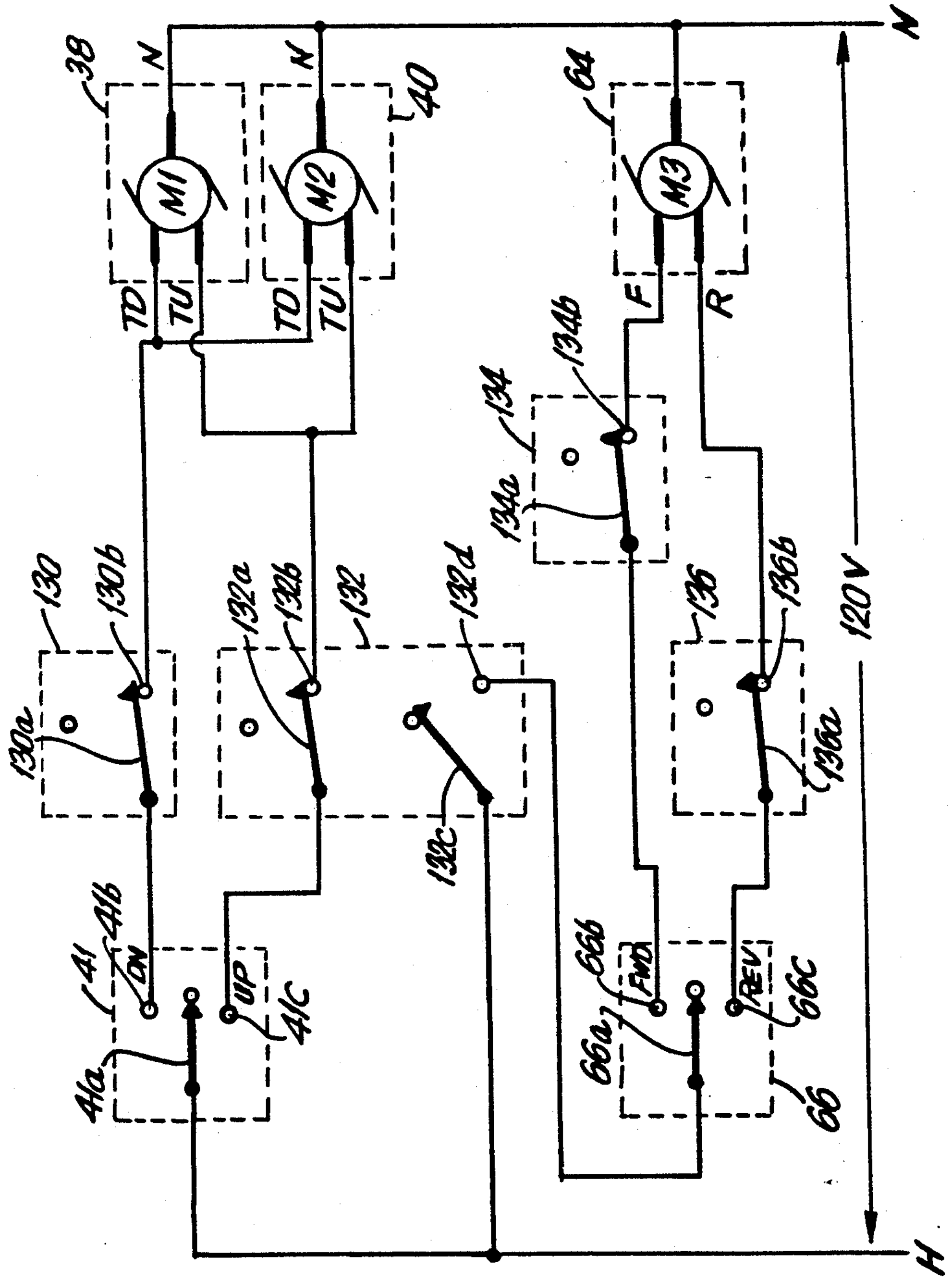
FIG. 10 is a schematic block diagram of an electrical switching arrangement incorporated in the present storage system.

FIG. 10 is a schematic block diagram of an electrical switching and wiring configuration for the present storage system.

A hot line (H) of the 120 volts AC mains is connected to a moveable contact 41*a* of the power switch 41 shown in FIGS. 1 and 2 on the left wall 16 of the garage structure 12. Switch 41 is preferably a key-operated selector switch with a spring return center off position. A normally open "down" contact 41*b* is connected to a down limit switch 130 associated with one of the elevating mechanisms 34, 36. Moving contact 130*a* is normally closed against fixed contact 130*b* until the elevating mechanisms 34, 36 are lowered to a predetermined loading position a certain height above the garage floor 24. Fixed contact 130*b* is connected to corresponding terminals TD of motors M1, M2 associated with the elevating mechanisms 38,40. Neutral terminals N of the motors M1, M2 are connected together to the neutral line of the AC mains.

An "up" fixed contact 41*c* of the switch 41 is connected to a moving contact 132*a* of an up limit switch 132 associated with elevating mechanisms 34, 36. Contact 132*a* is normally closed against a fixed contact 132*b* which in turn is connected to corresponding terminals TU of motors M1, M2. The hot line H of the AC mains is also connected to another moving contact 132*c* within the switch 132. Contact 132*c* is normally open with respect to fixed contact 132*d*. When the elevating mechanisms reach a predetermined height above the garage floor 24, moving contact 132*c* closes against contact 132*d* which in turn is connected to a moving contact 66*a* of forward-reverse switch 66. Switch 66 is preferably a key-operated, spring return center off selector switch, with fixed contacts 66*b*, 66*c*.

A forward limit switch 134 and a reverse limit switch 136 are positioned adjacent the forward and rear ends of the left fixed guide member 56. The purpose of the switches 134, 136 is to limit the extent of forward or reverse movement of the platform 98 along the fixed guide members 56, 58 by disconnecting the storage drive motor 64 from the AC mains after the platform is brought to an extreme forward or rear position by way of the cog wheel 74. Once the elevating mechanisms lift the platform 98 to an upper position aligned with the fixed guide members 56, 58, the moving contact 132*c* of limit switch 132 is closed against contact 132*d*, and the moving contact 66*a* of forward-reverse switch 66 is energized. The operator then moves the contact 66*a* to close against the reverse contact 66*c* which is connected to a moving contact 136*a* of the reverse limit switch 136. Contact 136*a* is normally closed against contact 136*b* which is connected to a reverse terminal R of the storage drive motor M3. After the platform 98 moves to a preset storage position, contact 136*a* is opened and the motor M3 is de-energized.

When the user wants to move the platform 98 forward onto the elevating guide members 52,54, he or she activates switch 66 to close contact 66*a* against contact 66*b* which is connected to a moving contact 134*a* of the forward limit switch 134. Contact 134*a* is normally closed against a fixed contact 134*b* which is connected to a forward terminal F of the storage drive motor 64 (M3). The motor 64 is then energized to turn the cog wheel 74 so as to advance the platform 98 onto the elevating guide members 52, 54 until the platform leaves the forward end 56*a* of the left fixed guide member. At such a moment, limit switch 134 opens and the motor 64 is again de-energized.

Operation of the overhead garage system 10 will be explained in connection with FIGS. 2, 4, and 7.

Assuming that the platform 98 is empty and a person wishes to load one or more articles on the platform for purposes of storage, platform 98 is lowered by actuation of the two-way switch 41 to the lowermost position Pl (FIG. 4) at which the article can be placed on the platform 98 by the person while standing on the garage floor 24. Next, switch 41 is actuated to cause upward elevating movement of the platform 98 via the elevating mechanisms 34, 36, until limit switches (not shown) associated with the motor drive units 38, 40 cause the units to stop operating with the platform 98 at the preset uppermost position P2 (FIG. 4). At the position P2, the open ends 52*b*, 54*b* of the elevating guide members 52, 54 are in close face-to-face alignment with the open ends 56*a*, 58*a* of the left and right fixed guide members 56, 58 as shown in dashed lines in FIGS. 4 and 7. As platform 98 rises to the upper position P2, the teeth 76 of the cog wheel 74 engage the leading ear 108 of the platform. As mentioned, the cog wheel 74 stays clear of the body of the center partition 110 in the basket 98. With the platform 98 now at the upper position P2, the person then actuates switch 66 to energize the storage drive motor 64 to drive the wheel 74 counterclockwise as viewed in FIGS. 4 and 7. The platform is then transported via the successive engagement of the cog wheel teeth 76 with the wire ears 108 on the platform from the upper position P1 toward the storage area on the fixed guide members 56, 58, at a storage level above and clear of the garage floor 24.

It will be appreciated that once platform 98 is moved off of the elevating guide members 52,54, the overhead space at the front portion of the garage structure 12 extends clear to the ceiling 22, thus permitting the forward hood part 28 and rood 30 of the automobile 14 to enter the garage without any obstruction by the present system 10. See FIGS. 1 and 4.

When a person wants to retrieve one or more articles from the storage area in the garage structure 12, he or she operates the switch 66 so as to cause the motor 64 to drive the wheel 74 in the clockwise direction as viewed in FIGS. 4 and 7. The storage platform 9 is then transported via the successive engagement of the cog wheel teeth 76 with the platform ears 108 out of the storage area on the fixed guide members 56, 58, and onto the elevating guide members 52, 54. The person then operates switch 41 to cause downward movement of platform 98 via elevating mechanisms 34, 36, until the limit switches in motor drive units 38, 40 stop the units from operating with platform 98 at the preset lowermost position P1. Articles on the platform can then be easily retrieved by the person while standing on the garage floor 24.

While the foregoing description represents a preferred embodiment of the invention, it will be obvious to those skilled in the art that various changes and modifications may be made, without departing from the true spirit and scope of the invention as pointed out in the following claims.

What I claim is:

1. A storage system comprising:

garage structure means including a garage floor and a ceiling a certain height above said floor, for housing a vehicle which occupies a certain parking space inside the garage structure means when the vehicle is parked on the garage floor;

lift means inside said garage structure means in a region of said parking space for receiving and delivering stored articles other than said vehicle, said lift means comprising storage shelf means for supporting the stored articles, and elevating means arranged to engage left and right sides of said storage shelf means for elevating said storage shelf means between a lower position at which the stored articles can be placed on or removed from the storage shelf means by an individual, and an upper position at which the storage shelf means is supported in a storage area;

wherein the upper position of said storage shelf means is a sufficient height above the lower position of the storage shelf means so that said vehicle can occupy said parking space inside the garage structure means and remain clear of said storage shelf means after said elevating means elevates the storage shelf means to the storage area at said upper position, and said storage shelf means includes means for enabling the storage shelf means to separate from said elevating means for extending overhead clearance above said parking space to the ceiling of said garage structure means.

2. A storage system according to claim 1, wherein said enabling means comprises wheel members fixed to said storage shelf means and arranged so as to ride on parts of said elevating means during operation of the storage system.

3. A storage system according to claim 1, wherein said elevating means comprises vertical drive means for selectively raising and lowering the storage shelf means.

4. A storage system according to claim 3, wherein said vertical drive means comprises a pair of motor drive arrangements each located to raise or lower a corresponding side of said storage shelf means.

5. A storage system according to claim 4, including means for synchronizing the operation of said pair of motor drive arrangements with one another so that sides of said storage shelf means are raised or lowered in unison with one another when the motor drive arrangements are operated.

6. A storage system according to claim 1, including stop means associated with said elevating means for preventing said storage shelf means from separating from said elevating means while the storage shelf means is raised or lowered between said lower and said upper positions by said elevating means.

7. A storage system according to claim 1, wherein said storage shelf means is in the form of a wire basket.

8. A storage system comprising:

garage structure means including a garage floor and a ceiling a certain height above said floor, for housing a vehicle which occupies a certain parking space inside the garage structure means when the vehicle is parked on the garage floor;

lift means inside said garage structure means in region of said parking space for receiving and delivering stored articles other than said vehicle, said lift means comprising storage shelf means for supporting the stored articles, elevating means arranged to engage left and right sides of said storage shelf means for elevating said storage shelf means between a lower position at which the stored articles can be placed on or removed from the storage shelf means by an individual, and an upper position, and storing means fixed to a part of said garage structure means and in operative relation with respect to said elevating means, for coupling with said storage shelf means when the elevating means is at the upper position, and for transporting said storage shelf means between said upper position and a storage area which is offset horizontally from said upper position and adjacent the ceiling of said garage structure means.

9. A storage system according to claim 8, wherein said elevating means comprises horizontally oriented first guide members that are coextensive with the left and the right sides of said storage shelf means.

10. A storage means according to claim 9, wherein said first guide members define tracks on which said storage shelf means is supported for horizontal sliding movement.

11. A storage system according to claim 10, including wheel members fixed to said storage shelf means for riding on the tracks defined by said first guide members.

12. A storage system according to claim 8, wherein the upper position of said storage shelf means is a sufficient height above the lower position of the storage shelf means so that said vehicle can occupy said parking space inside the garage structure means and remain clear of said storage shelf means after said elevating means elevates the storage shelf means to the upper position.

13. A storage system according to claim 8, wherein said lift means is constructed and arranged so that overhead clearance above said parking space extends to the ceiling of said garage structure means after said storage shelf means is transported to said storage area by said storing means.

14. A storage system according to claim 9, wherein said storing means comprises horizontally oriented second guide members fixed to said garage structure means, said second guide members having end located to confront corresponding ends of said first guide members when said elevating means is at said upper position, a motor, and drive means for coupling said motor to said storage shelf means so that the storage shelf means slides off of said first guide members and onto said second guide members when transported from said upper position to said storage area by said storing means.

15. A storage system according to claim 10, including stop means associated with said first guide members for preventing said storage shelf means from sliding off of the first guide members while the storage shelf means is raised or lowered between said upper and said lower positions by said elevating means.

16. A storage system according to claim 8, wherein said elevating means comprises vertical drive means for selectively raising and lowering the storage shelf means.

17. A storage system according to claim 16, wherein said vertical drive means comprises a pair of motor drive arrangements each located to raise or lower a corresponding side of said storage shelf means.

18. A storage system according to claim 17, including means for synchronizing the operation of said pair of motor drive arrangements with one another so that sides of said storage shelf means are raised or lowered in unison with one another when the motor drive arrangements are operated.

19. A storage system according to claim 8, wherein said storage shelf means is in the form of a wire basket.

20. A storage system according to claim 9, including means fixed with respect to said garage structure means for supporting said first guide members at end regions of said first guide members.

* * * * *